Aug. 11, 1970  R. E. ASHMORE  3,524,039
COPPER WELDING PROCESS
Filed May 29, 1968
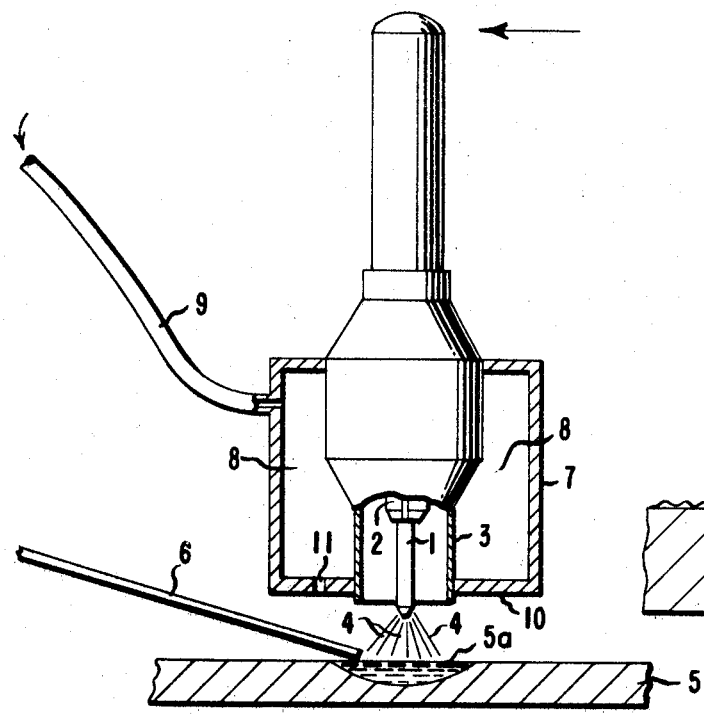
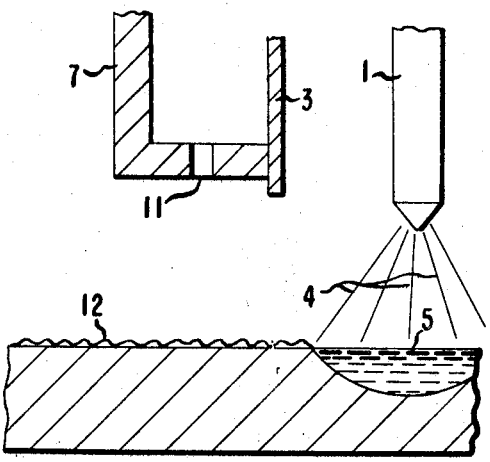
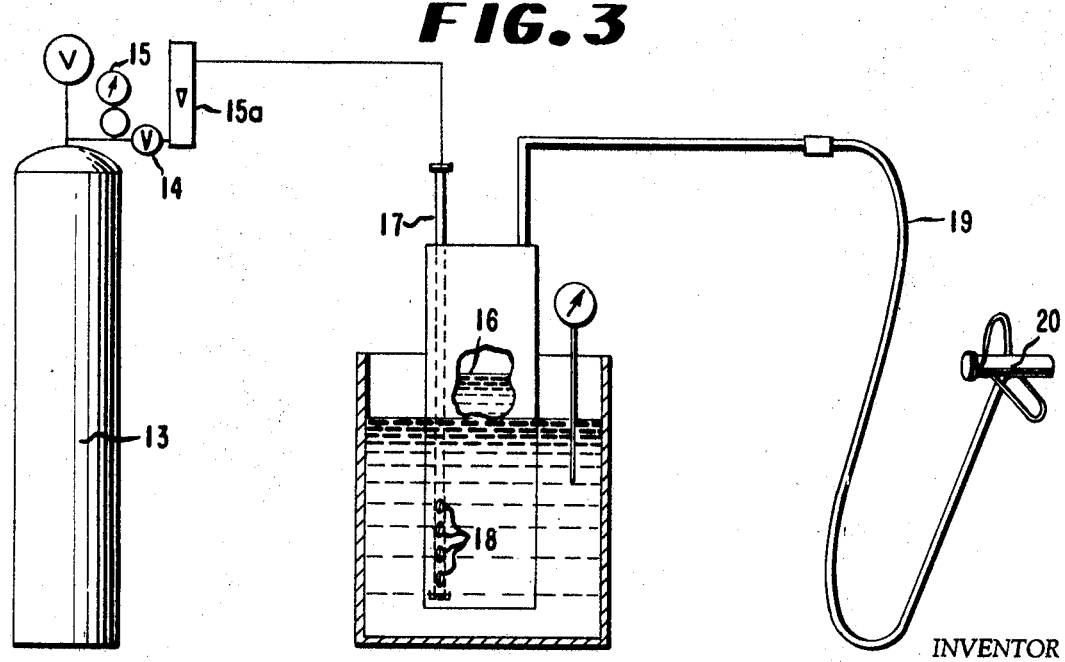
INVENTOR
RANSOM E. ASHMORE
BY *Fred C. Carlson*
ATTORNEY United States Patent Office 3,524,039
Patented Aug. 11, 1970

3,524,039
COPPER WELDING PROCESS
Ransom E. Ashmore, Louisville, Ky., assignor to E. I. du Pont de Nemours and Company, Wilmington, Del., a corporation of Delaware
Filed May 29, 1968, Ser. No. 732,951
Int. Cl. B23k 9/16, 35/38
U.S. Cl. 219—74
7 Claims

ABSTRACT OF THE DISCLOSURE

The tungsten-inert gas method of electric-arc welding of copper is improved by providing a gaseous shield containing methyl, ethyl, or isopropyl alcohol vapor or a hydrocarbon with up to four carbon atoms around the outside of the inert gas curtain, whereby the welds obtained are practically free of oxide occlusions and hence not subject to porosity in chemical usage.

BACKGROUND OF THE INVENTION

Because of its high heat conductivity and relatively good resistance to corrosion, copper is widely used in the fabrication of chemical process equipment. In such fabrication it is important to have means for making copper-to-copper joints, and the tungsten-inert gas (TIG) electrode has been used for this purpose. In this method an arc is struck between the copper work-piece and a non-consumable, high-melting tungsten electrode. The electrode and metal of the workpiece are protected against oxidation by a shroud of inert gas such as argon or helium, introduced through a nozzle concentric with the electrode so that the gas forms a curtain around the periphery of the weld.

Even when an inert gas shield is used as undesirable degree of oxidation of the copper often occurs. The copper oxides separate out at the grain boundaries when the molten weld metal solidifies, leading to such objectionable results as loss of ductility in the weld and development of porosity. Efforts to prevent oxide occlusions by using fluxes often give rise to another problem—namely, entrapment of flux particles. Phosphorus-deoxidized grades of copper contain residual amounts of phosphorus which help to combat copper oxide formation, but such grades of copper are available only at a premium price as compared with the more economic electrolytic grades.

SUMMARY

Now according to the present invention it has been found that by providing a shroud or shield, comprising a mixture of a non-oxidizing, non-combustible gas and a gaseous reductant selected from the group consisting of hydrocarbons with up to 4 carbon atoms and methanol, ethanol and isopropanol vapors, around the outside of at least the leading edge of the inert gas zone of a tungsten-inert gas torch during use in welding copper, welds can be made, even with electrolytic copper, which are characterized by freedom from oxide occlusions and from objectionable porosity and lack of ductility.

Advantageously, the apparatus used in carrying out a process of the invention can take the form of a chamber adapted to fit concentrically around a TIG torch, said chamber having inlet means for the protective gas mixture and outlet orifices so disposed that the gas escaping therethrough forms a curtain around at least the leading edge of the inert gas shield.

Whether the processes of this invention act to prevent the formation of oxides altogether, or merely to reduce them back to metal after they have been formed, is immaterial, the important consideration being that no such oxides persist into the final welds. It is known, of course, that copper surfaces which have been completely blackened by oxidation can be restored to a bright, unoxidized condition by heating to 400–500 C. and plunging into methyl or ethyl alcohol. However, I have found that copper welds which are bright on their surfaces may still contain oxide occlusions, and these can lead to ultimate porosity. Thus the present invention deals with more than surface oxidation.

BRIEF DESCRIPTION OF THE DRAWINGS

In the drawings, which are not to scale:
FIG. 1 is a cross-sectional view of a TIG welding torch in operation according to the invention, and
FIG. 2 is a more detailed view of FIG. 1, showing on a larger scale the manner of using a methane or methanol or ethanol vapor curtain in conjunction with the weld, and
FIG. 3 illustrates an apparatus used to supply a non-oxidizing, non-combustile gas, nitrogen, containing methanol vapor, to the weld area.

More particularly, FIG. 1 shows an inert tungsten electrode 1 supported by a collet 2 in an inner nozzle 3. An arc, represented by lines 4, is struck between the electrode and the copper workpiece 5 being welded, forming a molten pool of copper 5a, additional copper being supplied, if desired, by copper wire or rod 6. An outer nozzle 7 surrounds the electrode assembly, forming a chamber 8. This chamber is supplied with an atmosphere of nitrogen containing (preferably saturated with) methanol vapor, said atmosphere flowing in through tube 9 from an external source. Around that edge of the outer nozzle which is disposed toward the weld is a shoulder 10, at least the leading half of which is perforated by a series of small holes 11. These holes have the effect of jets in that they direct the flow of methanol-containing nitrogen toward the weld area, thus forming a gaseous shroud about it. The dircetion of travel of the welder in FIG. 1 is from right to left.

FIG. 2 shows in greater detail the preferred embodiment of the invention already illustrated in FIG. 1. The parts having numbers corresponding to those of FIG. 1 have corresponding functions. The nitrogen gas, containing methanol vapor, emanates from the orifices 11 and impinges upon the hot copper surface represented by the wavy line 12, whereby existence of copper oxide on the copper is obviated.

FIG. 3 illustrates an apparatus useful for preparing a nitrogen-methanol vapor mixture to be used according to this invention. Nitrogen from tank 13, adjusted to a suitable flow rate by means of valve 14, regulator 15 and flow-meter 15a, passes into a body of methanol 16 through pipe 17, said pipe having perforations 18 below the surface of the methanol body. The methanol-containing nitrogen passes through hose 19 to connector 20, said connector being adapted to make open connection with the gas inlet tube 9 of FIG. 1.

DESCRIPTION OF THE PREFERRED EMBODIMENTS

In making a weld according to the present invention the conventional practices of TIG arc welding are applied. The surface to be welded must be clean, the work-pieces being joined must be properly supported, and if necessary a rod of filler metal (copper) must be supplied. The considerations involved in making ordinary TIG arc welds are well known to those skilled in the art and are described, for instance, in the publication "How to Weld With Heliarc (trademark) Torches," copyright 1959 by Union Carbide Corporation. The descriptions in this publication are herein incorporated by reference.

The inert gas curtain can consist of helium, argon, or other inert gas, or mixtures of them. This gas flows downwardly from the tube, chamber or nozzle (3 of FIG. 1) around the tungsten electrode and forms a curtain around the electric arc and over the weld during the welding operation thus preventing copper oxide formation. The electrode is gradually moved along the work as the weld proceeds (in FIG. 1 the movement is from right to left) and the arc and gas curtain similarly move. The edge of the curtain in the direction toward which the electrode is moving is herein referred to as the leading edge.

The present invention superimposes upon at least the leading edge of the inert gas curtain a copper-protective shield of reductant gas. Advantageously the shield may entirely surround the gas curtain. The shield need not be in any particular physical form and may be described as a zone of the reductant gas outside the inert gas zone and extending from the TIG torch to the copper work piece. It can be formed by a jet or series of jets or openings in a concentric chamber surrounding the inert gas chamber of the welder (openings 11 in chamber 8 of FIG. 1), but a slot or series of slots, or a continuous, narrow opening can be used instead.

The protective gas shield must not, of course, ignite at the welding temperature. On the other hand it must contain a hydrocarbon of up to 4 carbon atoms, methanol, ethanol, or isopropanol all of which are highly flammable. According to the invention it has been found that by mixing with the reductant gas a non-oxidizing, non-combustible gas such as nitrogen, helium, or argon, a non-ignitable mixture can be made which provides the desired protective action.

In a preferred embodiment, nitrogen is saturated with methanol as described above in reference to FIG. 3, but less than saturation amounts can also be used. The reductant gas or vapor should preferably comprise at least about 5% by volume of the mixture, but even lesser proportions have some protective effect.

The gas mixture flow-rate required to provide an adequate shield will depend on such factors as the design of the equipment being used and the size of the weld. Those skilled in the art can readily ascertain when an adequate protective gas shield is present by observing the brightness of the copper at the leading edge of the weld and maintaining a sufficient gas flow to prevent substantial darkening due to surface oxide formation. The rate of gas flow required is unexpectedly low—for example, using an apparatus of the type illustrated in FIG. 1 and making welds on electrolytic copper plate ¼" thick, the rate for a gas consisting of nitrogen saturated with methanol or ethanol at 19° C. is of the order of 3 to 10 cubic feet per hour.

Since appreciable amounts of formaldehyde can be formed when welding according to this invention when methanol is used, adequate ventilation should be supplied.

It will be understood that the welding processes of this invention are applicable to copper containing minor amounts of alloying elements. They can be used, for instance, to weld phosphorus-containing copper, although, as above noted, the advantages are particularly noticeable with electrolytic copper.

This invention will be better understood by reference to the following illustrative example:

Example

Using an apparatus as shown in FIG. 1, with a 3/16"-diameter tungsten electrode and ER-Cu weld rod, ¼" electrolytic copper plates were arc-welded as follows:

The edges of the plates to be joined were beveled at a 38 to 45° angle with the plates clamped in position with a copper back-up strip under the weld. When welding was finished on one side, the plate was turned over and the rooted portion chipped out before making the final weld. In all cases the inert gas was argon, used at the rate of 20 cu. ft./hr. The outer was shield was nitrogen saturated at 19° C. with a reductant as shown in the following tabulation:

|  | Pass No. | Diameter weld rod (in.) | Amps. | Outer gas shield | |
|---|---|---|---|---|---|
|  |  |  |  | Reductant | Cu. ft./hr. |
| Weld #2 | 1 | ⅛ | 375 | Methanol | 10 |
|  | 2 | 3/16 | 375 | do | 5 |
|  | 3 | 3/16 | 375 | do | 5 |
| Weld #3 | 1 | ⅛ | 340 | Ethanol | 7 |
|  | 2 | ⅛ | 370 | do | 7 |
|  | 3 | ⅛ | 370 | do | 7 |
|  | 4 | ⅛ | 340 | do | 7 |
|  | 5 | ⅛ | 340 | do | 7 |

The finished welds were tested for face and root bend and in all instances were found to be satisfactory. Microexamination of weld cross sections showed them to be acceptably sound and free of oxides. The weld made under ethanol (#3) contained very fine porosity whereas there was none in the weld made under methanol (#2), but this porosity was of such a nature as to be considered not deleterious.

I claim:

1. In a process for welding copper wherein the copper is melted by an electric arc between it and a non-consumable electrode within a curtain of inert gas, the improvement which comprises providing a gaseous shield, comprising a mixture of a non-oxidizing, non-combustible gas and a gaseous reductant selected from the group consisting of hydrocarbons with up to 4 carbon atoms, and methanol, ethanol and isopropanol vapors around the outside of at least the leading edge of the inert gas curtain.

2. A process of claim 1 wherein the gaseous reductant is methanol.

3. A process of claim 2 wherein the gaseous reductant is ethanol.

4. A process of claim 1 wherein the non-oxidizing, non-combustible gas is nitrogen.

5. A process of claim 1 wherein the gaseous reductant is methanol and the non-oxidizing, non-combustible gas is nitrogen.

6. A process of claim 1 wherein the gaseous reductant is ethanol and the non-oxidizing, non-combustible gas is nitrogen.

7. A process of claim 1 wherein the copper being welded is electrolytic copper.

References Cited

UNITED STATES PATENTS

| 1,325,116 | 12/1919 | Sebille | 219—74 |
| 1,728,863 | 9/1929 | Ipsen | 219—74 |
| 1,933,343 | 10/1933 | Sandelowsky | 219—74 |
| 2,522,482 | 9/1950 | Olzak | 219—74 |
| 2,727,124 | 12/1955 | Hardin | 219—74 |
| 2,768,278 | 10/1956 | Gaines | 219—74 |
| 2,903,559 | 9/1959 | Wempe | 219—74 |
| 2,906,858 | 9/1959 | Morton | 219—121 |
| 2,929,912 | 3/1960 | Lesnewich | 219—74 |
| 3,243,569 | 3/1966 | Petry | 219—74 |
| 3,349,215 | 10/1967 | Wagenleitner et al. | 219—74 |

JOSEPH V. TRUHE, Primary Examiner

W. D. BROOKS, Assistant Examiner

U.S. Cl. X.R.

219—137, 118